United States Patent [19]

Paulk

[11] 4,230,188
[45] Oct. 28, 1980

[54] PEANUT DIGGER-SHAKER-INVERTER

[75] Inventor: John R. Paulk, Fitzgerald, Ga.

[73] Assignee: Paulk Manufacturing Co., Inc., Fitzgerald, Ga.

[21] Appl. No.: 724,306

[22] Filed: Sep. 17, 1976

[51] Int. Cl.³ ............................................. A01D 29/00
[52] U.S. Cl. ...................................... 171/101; 198/402
[58] Field of Search ........................ 171/101, 116, 61; 198/722, 402, 417

[56] References Cited

U.S. PATENT DOCUMENTS

| | | | |
|---|---|---|---|
| 3,469,634 | 9/1969 | Whitesides | 171/61 |
| 3,625,291 | 12/1971 | Paulk | 171/101 |
| 3,847,225 | 11/1974 | Whitfield et al. | 171/101 |

Primary Examiner—Jay N. Eskovitz
Attorney, Agent, or Firm—Newton, Hopkins & Ormsby

[57] ABSTRACT

The inverter section of the present peanut digger-shaker-inverter may be used under all types of field conditions and comprises two downwardly and inwardly inclined drums, each drum being associated with a set of inverting tines. Each drum includes a plurality of equally spaced discs each holding a plurality of curved finger rods with adjacent pairs of the inverting tines having portions straddling a disc and curving similarly thereto beneath the outer extremities of the curved finger rods so that peanut plants are subject to a positive force in moving along and through the set of inverting tines with the plants being bumped and agitated by the gentle prodding of the ends of the rods and thereby affording an additional cleaning or reshaking action which lets the loosened soil fall freely through the drums and not on the inverted peanut vines which have been deposited on the ground and also assuring proper drying conditions and minimum field losses of the peanuts.

6 Claims, 7 Drawing Figures

PEANUT DIGGER-SHAKER-INVERTER

BACKGROUND OF THE INVENTION

1. Field of the Invention

The present invention relates to peanut harvesting equipment that digs peanut plants from the ground, gently combines at least two rows of plants into a windrow and inverts the plants so that the nut pods are on the top of the windrow thereby assuring proper drying conditions and minimum field losses.

2. Description of the Prior Art

This invention is an improvement over my prior U.S. Pat. No. 3,625,291 for a Peanut-Harvesting Machine that issued on Dec. 7, 1971. Basically, the present invention is directed to digger-shaker-inverters of the type generally exemplified by U.S. Pat. Nos. 2,669,820, 2,722,794, 3,473,615, 3,454,100, 3,726,345, 3,750,865, and 3,847,225.

In recent years, considerable effort has been expended with respect to the development of agricultural machines which dig and distribute peanut plants on a field in windrows so that the crop may be cured or dried prior to further processing as by a peanut combine. In particular, various techniques for causing the peanut plants to be deposited in inverted condition in windrows have been developed in machines known as digger-shaker-inverter machines. Such machines first dig the peanut plants by severing the root system below the peanut pods, subject the plants to a shaking action as they are elevated by a conveyor to remove the soil and then transfer the vine mass onto an inverting apparatus that turns the plants upside down in a windrow so that foliage supports the peanut pods in uppermost, exposed condition. The chief advantages of inverting the plants are that it promotes faster and more uniform drying of the peanut pods, reduces time in the windrow so that there is less risk of damage from inclement weather, minimizes damage to the peanuts if rain does occur during windrow drying, provides a less favorable environment for mold formation during the windrow period, promotes cooler kernel temperatures as compared with peanut pods in contact with the soil, and lessens harvesting field losses.

However, as with any machine, digger-shaker-inverters are not entirely free from disadvantages or problems. In these machines, two basic approaches to accomplish the inversion are employed. One approach involves grasping the tops or foliage of the plants and turning them upside down in a positive manner whereas the other basic approach involves elevating the plants and then constraining them to roll over as they fall under the influence of gravity. Regardless of the prior approach employed, variations in the type of soil and in soil conditions such as moisture content, and the presence of weeds or grass can create problems including proper and sufficient dirt removal.

SUMMARY OF THE INVENTION

Accordingly, it is of primary concern in connection with the present invention to provide an improved type of digger-shaker-inverter wherein the inverter section is fully effective to achieve its inverting function while, at the same time, it contributes materially to a reshaking or additional cleaning action during the inversion step but does so without the danger of increasing the number of peanuts which will be lost in the harvesting operation.

In particular, the present invention is directed to an improved form of inverter mechanism which includes two downwardly inclined drums that include a plurality of equally spaced spider discs mounted along a common central shaft. Each disc includes a plurality of curved rod-like fingers or spiders that account for from 65 to 75% of the diameter of the spider discs. The discs of each drum are divided into two sections, an upper section and a lower section. The upper section includes spiders of the same diameter, thereby producing an upper cylindrical section. The lower section includes spider discs of progressively increasing diameter, the bottom spider disc having the largest diameter, thereby producing a lower frusto-conical section. The outer portion of the fingers of the spider discs ranges approximately between 16.3 to 14% of the spider disc radius and forms angles with an intercepting radius within the range of 50° to 45°, the angle being away from the direction of rotation of the drums, each drum being in association with a tine set wherein the spider drum structures readily permit the passage of removed soil therethrough and which are particularly constructed and detailed in design to cooperate with certain portions of the tine sets to effect a bumping and reshaking or additional cleaning action on the dug plants while conveying them along the tine sets for inversion whereby an extended or additional shaking or recleaning action is effected during the inversion step in a very efficient manner so that the action does not tend significantly to increase the amount of peanuts which are separated from the plants and thus lost to the harvesting operation.

The spider drums of the present invention (1) positively control the vine mass after it is dropped off onto the inverting attachment by exhibiting a positive force on the vine mass in moving it through the inverting tines; (2) avoid excessive buildup of soil and prevent any wrapping of the vines in the drum area; and (3) gently prod the nut clusters while on the inverting tines thereby offering an additional cleaning action which lets the loosened soil fall freely through the spider drum and not onto the peanut vines which have been deposited on the ground.

Accordingly, it is of primary concern in connection with the present invention to provide a root crop harvesting apparatus which is operable for digging root crops from their growing implacement in the ground, orienting the plants in an inverted position with the root crop portion located above the plant or foliage portion and removing soil from the plants in the process. Specifically, it is an object of the present invention to provide a root crop harvesting apparatus which is operable for digging root crops from a pair of adjacent rows thereof, forming the root crops from the two rows into a compact windrow located between the two dug rows and simultaneously inverting the root crop in the windrow forming operation and for achieving such an effective cleaning or shaking action throughout this process as will more efficiently clean the plants without effecting such violent action thereon as will be detrimental to the harvesting operation.

DETAILED DESCRIPTION OF THE INVENTION

Figure 1:
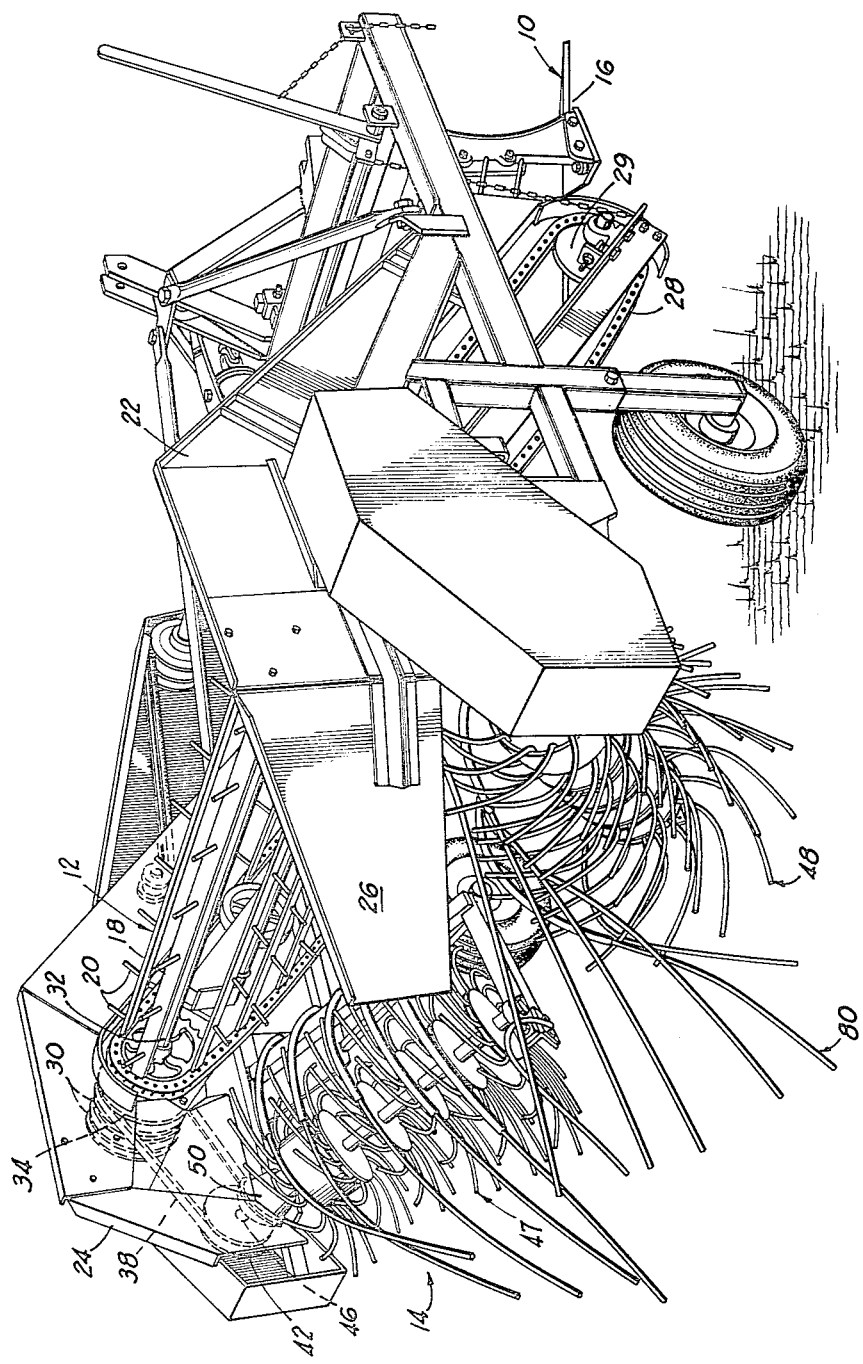
FIG. 1 is a perspective view of the rear or discharge end of a digger-shaker-inverter according to this invention.

In the apparatus shown in FIG. 1, the digger-shaker-inverter shown therein includes the three essential sections for performing the requisite functions, namely, the digger section indicated generally by the reference character 10 and disposed at the forward end of the apparatus, the conveying means indicated generally by the reference character 12 and the inverting means indicated generally by the reference character 14 disposed at the rearward end of the apparatus. The digging means and the conveying means may be of entirely conventional configuration and construction such as is disclosed for example in U.S. Pat. No. 3,726,345, the details of which are incorporated herein by reference thereto. For the purpose of this description, suffice it to say that the digging means 10 includes cutters such as the cutter blades 16 which are adapted to operate subterraneously to sever the tap root system of the peanut plants below the peanut pod clusters thereof and additionally includes a centrally located spring loaded coulter that cooperates with two other coulters mounted on the sides of the propelling tractor for severing the root systems laterally to either side of a crop row so as to allow two adjacent rows of the peanut plants to be dug up and removed from their ground implantation whereafter they are picked up by the conveying and shaking means 12 so that the two rows of dug plants are elevated in upwardly inclined paths to the elevated, rearward or discharge end of the conveying means 12 whereupon the two rows of plants fall by gravity onto respective assemblies hereinafter described which form the inverting means 14.

The conveying means or reel 12 is of open framework configuration and construction and includes conveyor slats such as those indicated by reference character 18 and having teeth 20 thereon and which are joined in endless fashion to elevate the two rows of dug crop and to impart in the process a shaking or cleaning action thereon so that clods of dirt and debris, in general, clinging to the root system will fall by gravity through the open construction of the conveying means 12 to reach the ground surface.

The two rows of crops which are dug by blades 16 and picked up by the conveying means 12 are deposited on the latter adjacent the opposite sides thereof and thus drop from the conveyor means 12 in the region immediately above the two spider drum and tine assemblies which form the inverting means 14. The conveying means 12 is provided with opposite side boards such as the side boards 22 and rearward extensions 24 and 26 thereof to assure that the plant rows are directed properly onto the spider drum and tine assemblies. The endless conveyor mechanism of the conveying means 12 is positively driven as by means of the belts 28 through lower pulleys 29, which are driven by connection with the power take-off means, and associated pulleys 30 positioned on the outer end of upper shaft 32 which impart drive to the upper shaft 32 as is shown in FIG. 1. Inwardly of pulleys 30 each end of the upper shaft 32 of the conveying means 12 carries sprockets 34 over which the respective belts 38 are trained. These belts or chains respectively are engaged with the further sprockets 42 which are affixed to the respective stub shafts 46 for imparting drive to the respective spider drum assemblies 47 and 48 hereinafter described more particularly.

Figure 2:
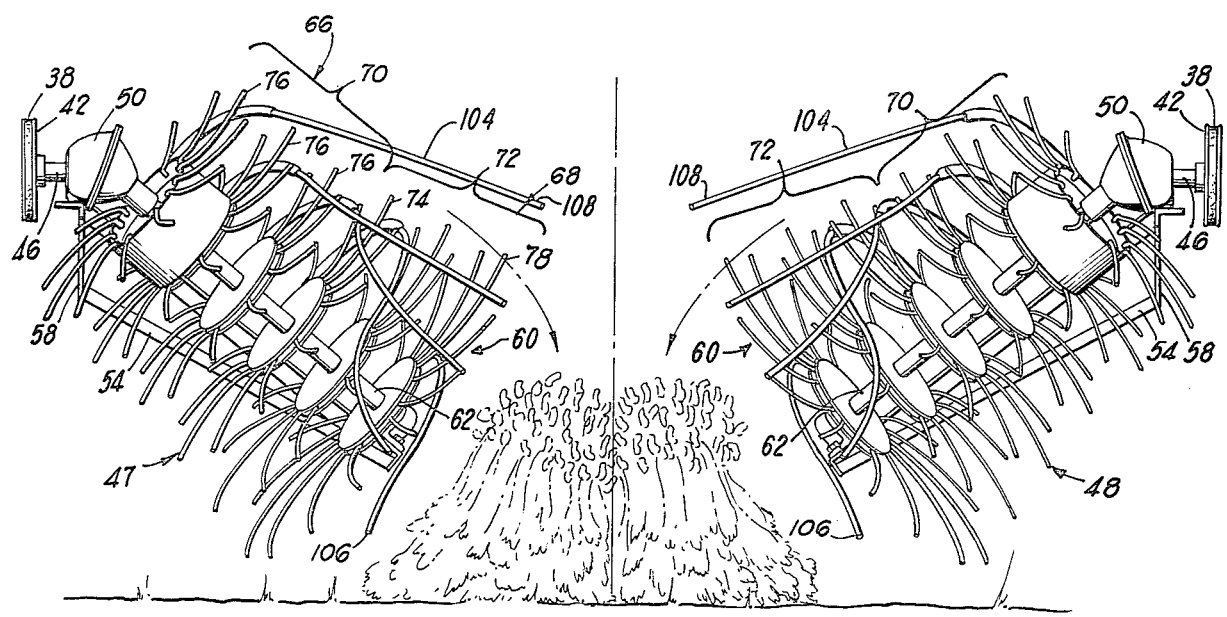
FIG. 2 is a top view of the inverting apparatus embodied in the machine in FIG. 1.
Figure 3:
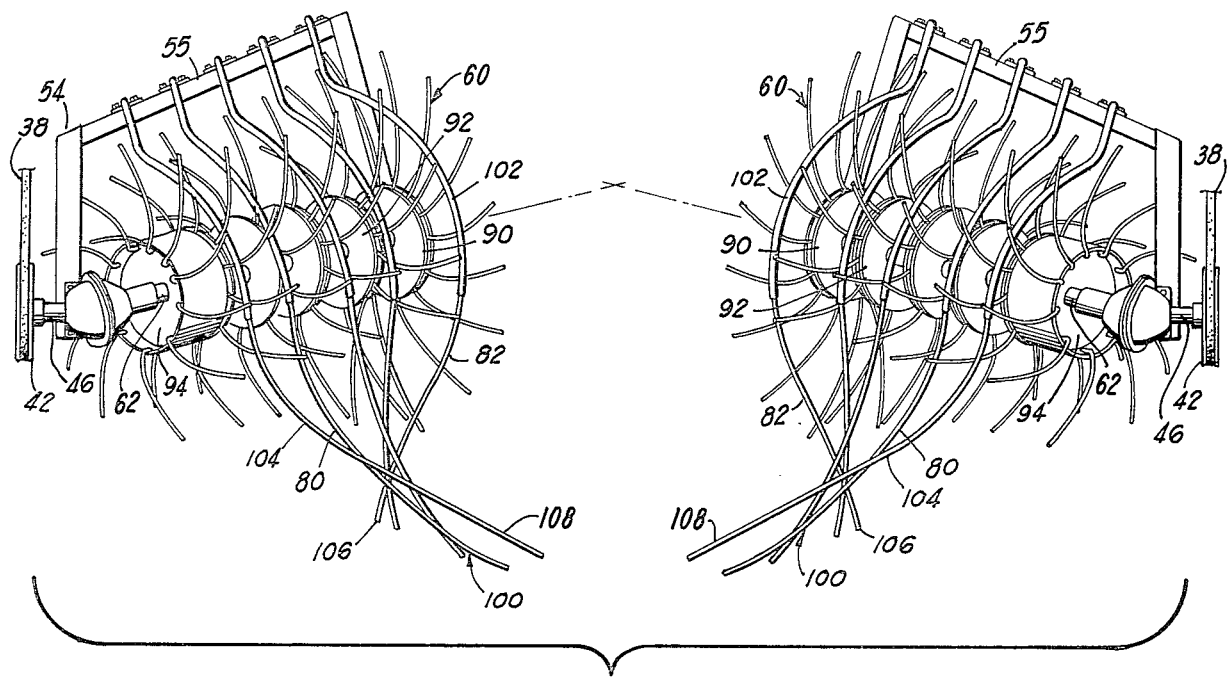
FIG. 3 is a rear elevational view of the inverting apparatus as shown in FIG. 2.
Figure 4:
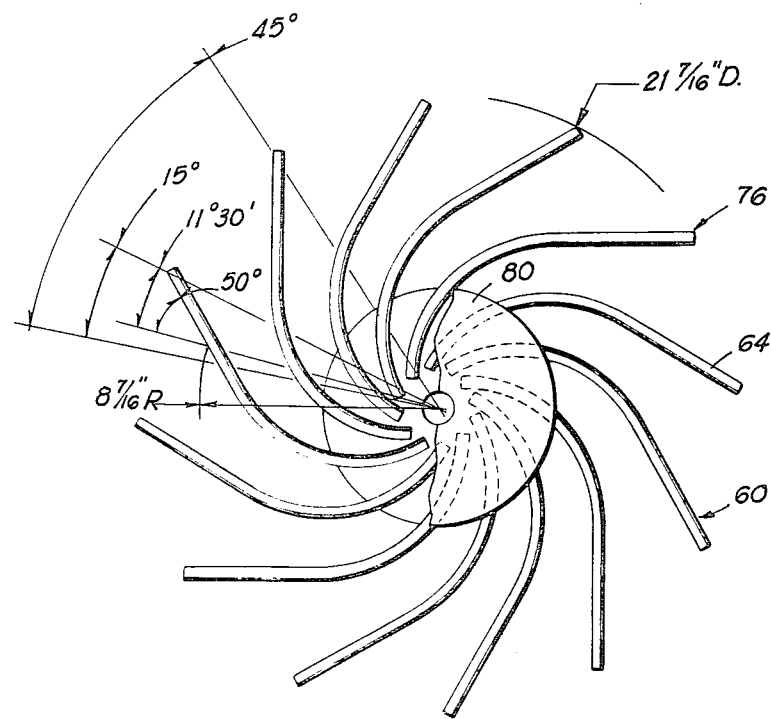
FIG. 4 is a side elevational view of one of the three spider drums that make up the upper cylindrical section removed from its in-place environment.
Figure 5:
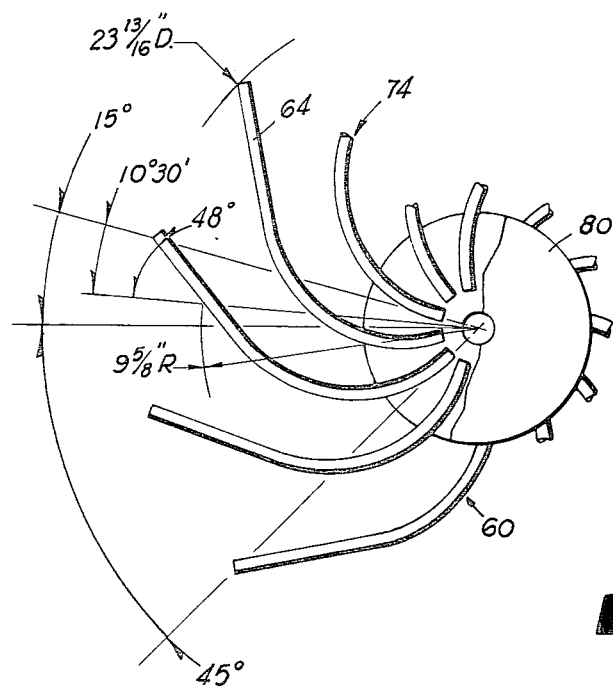
FIG. 5 is a partial side elevation with some parts broken away showing the angularization of the distal end of the uppermost spider drum of the lower frusto-conical section removed from its in-place environment.
Figure 7:
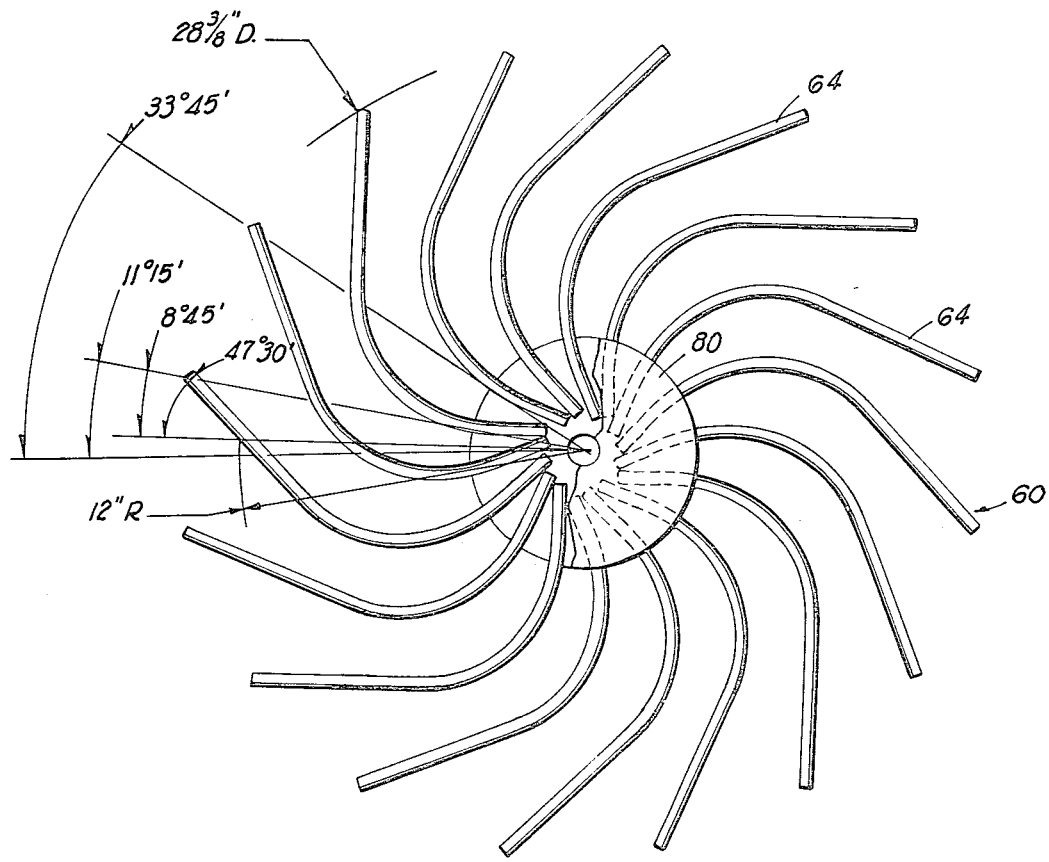
FIG. 7 is a side elevational view of the lowest spider drum of the lower frusto-conical section removed from its in-place environment.
Figure 6:
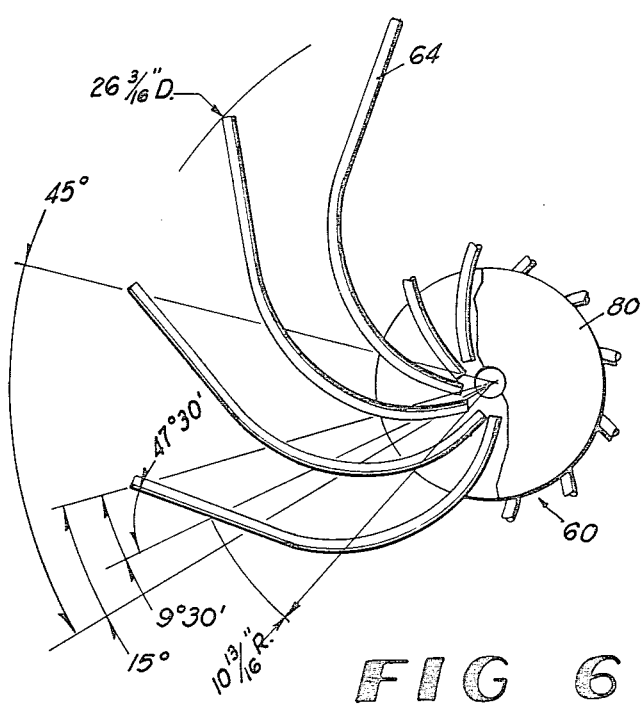
FIG. 6 is a partial side elevation with some parts broken away showing the angularization of the distal end of the spider drum that is located next to the lowest spider drum of the lower frusto-conical section and removed from its in-place environment.

As will be evident more particularly from FIGS. 1, 2 and 3, the stub shafts 46 are rotatably journaled in gear boxes 50 which are attached to the frame members 54 depending from the main frame of the conveying means 12. Each of these frame members 54 includes an upstanding member 58 as shown in FIG. 2.

The construction of each spider drum assembly will be more readily apparent from a study of FIGS. 1, 2 and 3. In these Figures, it will be seen that each spider assembly comprises a series of spaced, annular spider discs 60 joined together through central shaft 62.

Each spider disc 60 includes a plurality of curved rod-like fingers or spiders 64. The spider discs 60 of the inverting drums 47 and 48 are divided into two sections as shown in FIG. 2, an upper section 66 and a lower section 68. The upper section includes three discs, the distal ends 65 of the rods forming spiders of the same diameter thereby producing an upper cylindrical section 70. The lower section includes three discs, the distal ends 65 of the rods forming spiders of progressively increasing diameter, the bottom spider having the largest diameter thereby producing a lower frusto-conical section 72. The smallest spider 74 of each frusto-conical section 72 is approximately 6.4% larger in diameter than the spiders 76 of each upper cylindrical section 70, with the largest spider 78 of each frusto-conical section 72 being approximately 33% larger in diameter than the spiders of each cylindrical section 70. The rod-like finger or spider portions that extend from the hub 80 of each spider disc 60 account for 66% of the diameter of the spider discs of the upper cylindrical section 70 to 72% of the diameter of the largest spider disc of the lower frusto-conical section 72. The outer portion of the radius of the spider discs 60 formed by the distal ends 65 of curved rods ranges from 16% of the radius of the spider discs of the upper cylindrical section 70 to 14% of the radius of the lowest spider disc 78 of the lower frusto-conical section 72 and forms angles with an intercepting radius with the curved rods 64 at the outer specified range of distances of the radius of the spiders within the range of 50° to 47.5° as shown in FIGS. 4 through 7. The largest such angle being formed in the spider is of smallest diameter, namely spiders of upper cylindrical section 70.

The fingers or spiders 64 of the outermost 15% of the radius of the spider discs 60 extend above the inverting tines 81 and 82 with which they are associated. The spider fingers 64 of the upper cylindrical section 70 cooperate with approximately half the length of the inverting tines 81 with which they are associated. The spider fingers 64 of the lower frusto-conical section 72 cooperate with more than one-half the length of the inverting tines 82 with which they are associated. All of the spider fingers 64 are curved away from the rear of the inverter.

As shown in FIG. 2, the drum assemblies 47 and 48 are positioned at an angle of about 40° from the horizontal in a plane perpendicular to the machine's line of travel. As shown in FIG. 3, the lower end of the drum shaft 62 is then rotated forward in the machine's direction of travel at an angle of approximately 13.5°.

As can be seen in FIG. 3, the set of inverting tines generally indicated by the reference numeral 100 in each case is removably secured to the relevant cross frame member 55. The innermost tine 102 is positioned to extend between the innermost disc 90 and the next adjacent disc 92 and the outermost tine 104 is disposed inboard of the outer disc 94, as is shown in FIGS. 2 and 3, with the remaining tines of the set being interposed such that each adjacent pair of tines straddles one of the discs, as shown.

Each tine has a trailing end portion which travels behind its respective spider drum assembly. This trailing end portion of the innermost tine 102 is indicated by the reference character 106 and, as will be seen from FIGS. 1, 2 and 3, this portion of the innermost tine 106 extends substantially vertically downwardly from the spider drum assemblies. The outermost tine 104, on the other hand, has a trailing end portion 108 which is disposed generally horizontally and also extends laterally inwardly as will also be seen from FIGS. 2 and 3. The intermediate tines of each set progressively bend downwardly and extend laterally progressively to lesser degrees as will be evident in FIGS. 2 and 3 with the spacing between the two spider drum assemblies and their associated tines being such that the tines define between them a windrow-forming region whereat the two rows of plants are crowded together into a single compact windrow with the foliage disposed lowermost and the root system being disposed uppermost and at the upper side of the windrow.

Each tine also includes a mounting end portion as is illustrated in FIG. 3, such mounting end portion in each case extending rearwardly from the region of the support frame member 55 upwardly and over the associated spider drum assembly and being curved similarly to the curvature of the spider discs and located at the level beneath the outer 15% of the radius of each disc. Each spider drum assembly is rotating at substantially the same angular velocity as is the main drive shaft of the conveying means 12. Thus, because the individual spider discs are of relatively large diameter, they are driven at a relatively high rate of linear velocity so that the crop when it is discharged onto a spider drum assembly, and supported by the tine set thereof, will be gently bumped and agitated as the discs rotate and sweep past the so supported crop rows. There is of course a net positive feeding action of the crop along the tine sets so that ultimately the plants are discharged in inverted fashion into the single windrow. At the same time, the spider drum assemblies and the associated inverting tines allow a gentle but very effective bumping and agitating action to occur on the plants while they are in the inverting stage. In consequence, an appreciable degree of shaking or additional cleaning action of the crop is effected, as needed, by the inverting section of the machine or apparatus but due to the detailed disposition of the component parts as described hereinabove, this action is not so violent or forceful as will significantly cause peanuts to be separated or dislodged from the plants and thus fall to the ground where they cannot be harvested. Each spider drum assembly is of a form so as to be completely open and to allow the free passage of dirt and debris from the plants without tending to cause any clogging action.

It should be understood that the just described embodiments merely illustrate principles of the invention in preferred form. Many modifications, additions and deletions may, of course, be made thereto without departure from the spirit and scope of the invention as set forth in the following claims.

What I claim is:

1. In a root crop harvesting apparatus having digging means for digging root crop plants from their growing implantation in the ground, shaker-conveyor means receiving said plants for shaking them to remove debris while conveying them to elevated discharge disposition, and inverter means intercepting the discharged plants from the shaker-conveyor means for directing them in inverted position in a windrow behind the apparatus, the improvement wherein said inverter means comprises a pair of open-like inverting drums, each drum including a plurality of spaced spider discs mounted along a common central shaft, said spider discs having finger portions that constitute the majority of the diameter of said discs and that are curved in a direction away from the rear of said harvesting apparatus, means for rotating said open-like inverting drums about downwardly inwardly inclined axes that positions said spider discs at an angle that is substantially displaced from the horizontal plane of the ground, and a set of inverting tines operatively associated with each of said open-like inverting drums and positioned below the distal end of said finger portion to support the plants as they pass over and are gently agitated and bumped by the fingers of said discs while being positively urged along the inverting tines, said fingers of each of said inverting drums operatively extending along substantially half the length of its associated set of tines thereby exerting positive control on the moving plants after being discharged onto the inverting means and subjecting said plants to an additional cleaning action during the inversion state so that the loosened soil falls freely between said spaced spider discs and through the inverting drums and not onto the inverted vines which have been deposited on the ground.

2. In an apparatus as defined in claim 1 wherein said angle of curvature at the distal end of said fingers is within the range of 45° to 50° with an intercepting radius of said spider discs.

3. In an apparatus as defined in claim 2 wherein the distal end of said fingers is approximately the outer 15% of the radius of the spider discs.

4. In an apparatus as defined in claim 1 wherein said inverting drums include an upper cylindrical section and a lower frusto-conical section.

5. In an apparatus as defined in claim 1 wherein the distal end of said fingers extends above the inverting tines with which it is associated a distance of approximately 15% of the radius of said spider disc drum.

6. In an apparatus as defined in claim 1 wherein said finger portions constitute 65% to 75% of the diameter of said discs.

* * * * *